United States Patent
Nagy

(10) Patent No.: US 9,211,620 B2
(45) Date of Patent: Dec. 15, 2015

(54) HAND POWER TOOL HAVING A DRUM-TYPE TOOL CHANGE MAGAZINE

(71) Applicant: Robert Bosch GmbH, Stuttgart (DE)

(72) Inventor: Attila Nagy, Miskolc-Szirma (HU)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 13/677,070

(22) Filed: Nov. 14, 2012

(65) Prior Publication Data

US 2013/0137559 A1    May 30, 2013

(30) Foreign Application Priority Data

Nov. 29, 2011 (DE) .......................... 10 2011 087 293

(51) Int. Cl.

| | |
|---|---|
| B23Q 3/157 | (2006.01) |
| B25F 1/04 | (2006.01) |
| B25F 5/02 | (2006.01) |
| B25B 21/00 | (2006.01) |
| B23Q 3/155 | (2006.01) |
| B25B 23/00 | (2006.01) |

(52) U.S. Cl.
CPC ............ *B23Q 3/15506* (2013.01); *B25B 21/00* (2013.01); *B25B 23/0035* (2013.01); *B25F 1/04* (2013.01); *B25F 5/029* (2013.01); *B23Q 3/15766* (2013.01); *Y10T 483/11* (2015.01); *Y10T 483/1755* (2015.01); *Y10T 483/1798* (2015.01); *Y10T 483/1827* (2015.01)

(58) Field of Classification Search
CPC ..................... B23Q 3/15766; Y10T 483/1798; Y10T 483/1827; Y10T 483/179; Y10T 483/1779; Y10T 483/1783; Y10T 483/1767; Y10T 483/1769; Y10T 483/1771; Y10T 408/37; Y10T 279/17008
USPC ................. 483/57, 61, 54, 49, 51, 44, 45, 46; 408/35; 81/177.4, 439, 490; 279/14
See application file for complete search history.

(56) References Cited

U.S. PATENT DOCUMENTS 3,799,561 A * 3/1974 Humbert .......................... 279/51
4,604,005 A * 8/1986 Russ .............................. 408/35

(Continued)

FOREIGN PATENT DOCUMENTS

| CN | 201055983 Y * 5/2008 |
|---|---|
| DE | 199 51 264 A1 5/2001 |

(Continued)

OTHER PUBLICATIONS

Machine translation of CN-201055983-Y, which CN '983 was published May 2008.*

(Continued)

*Primary Examiner* — Erica E Cadugan
(74) *Attorney, Agent, or Firm* — Maginot, Moore & Beck LLP

(57) ABSTRACT

A hand power tool has a tool receiver which is configured to receive a tool and which has an inner receiver. The tool receiver is provided on an associated tool housing, in which there is disposed a drum-type tool change magazine having at least one tool chamber for storing the tool. The tool chamber is configured to be aligned so as to be flush with the inner receiver to enable the tool to slide from the tool chamber into the inner receiver or from the inner receiver into the tool chamber. A braking device is configured to brake the tool as the tool slides from the tool chamber into the inner receiver.

16 Claims, 4 Drawing Sheets

(56) References Cited

U.S. PATENT DOCUMENTS

| | | | |
|---|---|---|---|
| 4,976,175 A | 12/1990 | Hung | |
| 5,065,498 A * | 11/1991 | McKenzie | 483/57 |
| 5,382,030 A * | 1/1995 | Kanaan | 279/46.7 |
| 8,007,424 B2 * | 8/2011 | Moser et al. | 483/57 |

FOREIGN PATENT DOCUMENTS

| | | |
|---|---|---|
| DE | 100 13 984 A1 | 9/2001 |
| DE | 20 2004 019 047 U1 | 5/2006 |
| DE | 10 2006 040 005 A1 | 3/2007 |
| DE | 10 2006 059 688 A1 | 6/2008 |
| GB | 1 187 585 | 4/1970 |
| WO | 2013/020485 A1 | 2/2013 |

OTHER PUBLICATIONS

Machine Translation CN 201055983 Y, which CN '983 was published May 2008.*
Dictionary definition of "hook", from http://dictionary.reference.com/browse/hook as of Mar. 31, 2015.*
Introduction to Materials Science for Engineers, $3^{rd}$ ed., by James F. Shackelford, 1992, pp. 329-335.*

* cited by examiner

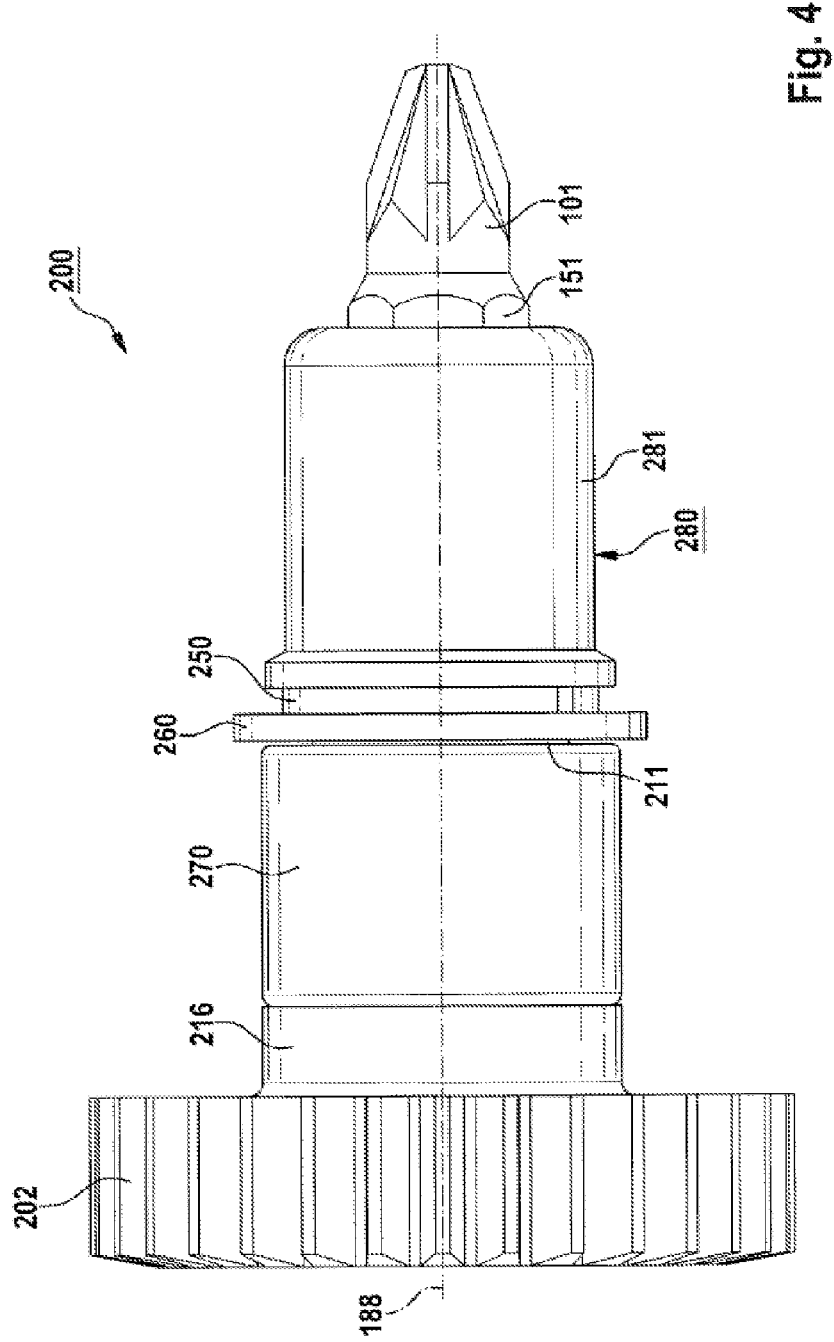

HAND POWER TOOL HAVING A DRUM-TYPE TOOL CHANGE MAGAZINE

This application claims priority under 35 U.S.C. §119 to patent application no. DE 10 2011 087 293.0, filed on Nov. 29, 2011 in Germany, the disclosure of which is incorporated herein by reference in its entirety.

BACKGROUND

The disclosure relates to a hand power tool having a tool receiver, which is configured to receive a tool and which has an inner receiver and is provided on an associated tool housing, in which there is disposed a drum-type tool change magazine having at least one tool chamber for storing the tool, which tool chamber can be aligned so as to be flush with the inner receiver, to enable the tool to be slid over from the tool chamber into the inner receiver or from the inner receiver into the tool chamber.

DE 10 2006 059 688 A1, the subject matter of which is incorporated herein in its entirety by reference, discloses such a hand power tool, which has a tool change magazine that is mounted in a rotationally movable manner in an associated tool housing and that is provided with a multiplicity of tool chambers provided with differing tools and that can be turned, about an associated rotation axis, into differing tool change positions. In these tool change positions, respectively one of the tool chambers is aligned so as to be flush with an associated tool receiver, such that a tool disposed in the tool chamber can be slid over into the tool receiver and back out of the tool receiver, into the tool change magazine, by means of a rod-shaped slide-over element displaceably disposed in the tool housing.

A disadvantage of the prior art is that a comparatively forceful sliding-over of a tool from the tool chamber into the tool receiver, owing to an abrupt actuation of the slide-over element by a respective user, can result in the tool slipping out, or being ejected, from the tool receiver. This can result in damage to the tool and/or in injury to the user of the hand power tool. Moreover, such an ejection impairs comfort in the use of such a hand power tool.

SUMMARY

It is therefore an object of the disclosure to provide a new hand power tool having a drum-type tool change magazine and an associated tool receiver, with which a tool can be effectively prevented from slipping out, or being ejected, from the tool receiver as the tool is slid over out of the tool change magazine into the tool receiver.

This problem is solved by a hand power tool having a tool receiver, which is realized to receive a tool and which has an inner receiver and is provided on an associated tool housing, in which there is disposed a drum-type tool change magazine having at least one tool chamber for storing the tool, which tool chamber can be aligned so as to be flush with the inner receiver, to enable the tool to be slid over from the tool chamber into the inner receiver or from the inner receiver into the tool chamber. A braking device is provided for braking the tool as the tool is slid over from the tool chamber into the inner receiver.

The disclosure thus makes it possible to provide a hand power tool having a drum-type tool change magazine and an associated tool receiver, with which a tool can be safely and reliably prevented from slipping out, or being ejected, from the tool receiver as the tool is slid over out of the tool change magazine into the tool receiver, by braking the tool as it is slid over.

The braking device is preferably realized to prevent the tool from slipping out from an axial end of the inner receiver that faces away from the tool chamber, as the tool is slid over from the tool chamber into the inner receiver.

It is thus made possible to provide a hand power tool with which possible risks of injury are at least reduced for a respective user when sliding the tool over out of the tool change magazine into the tool receiver.

According to one embodiment, the braking device has a braking member that is elastically deformable, at least regionally.

The disclosure thus makes it possible to provide a simple and uncomplicated braking device.

The braking member is preferably a sleeve, at least portionally.

It is thus made possible to provide a rapidly mountable and inexpensive braking element.

According to one embodiment, the braking member has a hook-shaped end region for generating a braking frictional force on the tool.

The disclosure thus makes it possible to provide a simple and stable braking member.

The hook-shaped end region is preferably realized to generate a spring force that brakes the tool as a result of an elastic deformation as the tool is slid into the hook-shaped end region.

It is thus possible to provide a robust and operationally safe braking member.

According to one embodiment, the hook-shaped end region has an at least approximately annular friction region having an inner diameter that is smaller than an outer diameter assigned to the tool.

The disclosure thus makes it possible for a predefined frictional force to be easily transmitted from the annular friction region onto a tool as the tool is slid over out of the tool change magazine into the tool receiver.

The inner diameter is preferably smaller than an inner diameter assigned to the inner receiver.

The predefined frictional force can thus be safely and reliably transmitted from the annular friction region onto the tool as the tool is slid over out of the tool change magazine into the tool receiver.

The friction region is preferably disposed with a predefined spacing in relation to an axial end of the inner receiver that faces away from the tool chamber.

It is thus possible to achieve at least a reduction of an effective frictional force applied to the tool as the tool is slid over from the tool receiver into the tool change magazine.

According to one embodiment, the blocking member comprises an elastomer, in particular rubber.

The disclosure thus makes it possible to provide a stable and inexpensive blocking member.

BRIEF DESCRIPTION OF THE DRAWINGS

The disclosure is described more fully in the following description with reference to exemplary embodiments represented in the drawings, wherein:

FIG. 4 shows a side view of the arrangement of FIG. 3.

DETAILED DESCRIPTION

Figure 1:
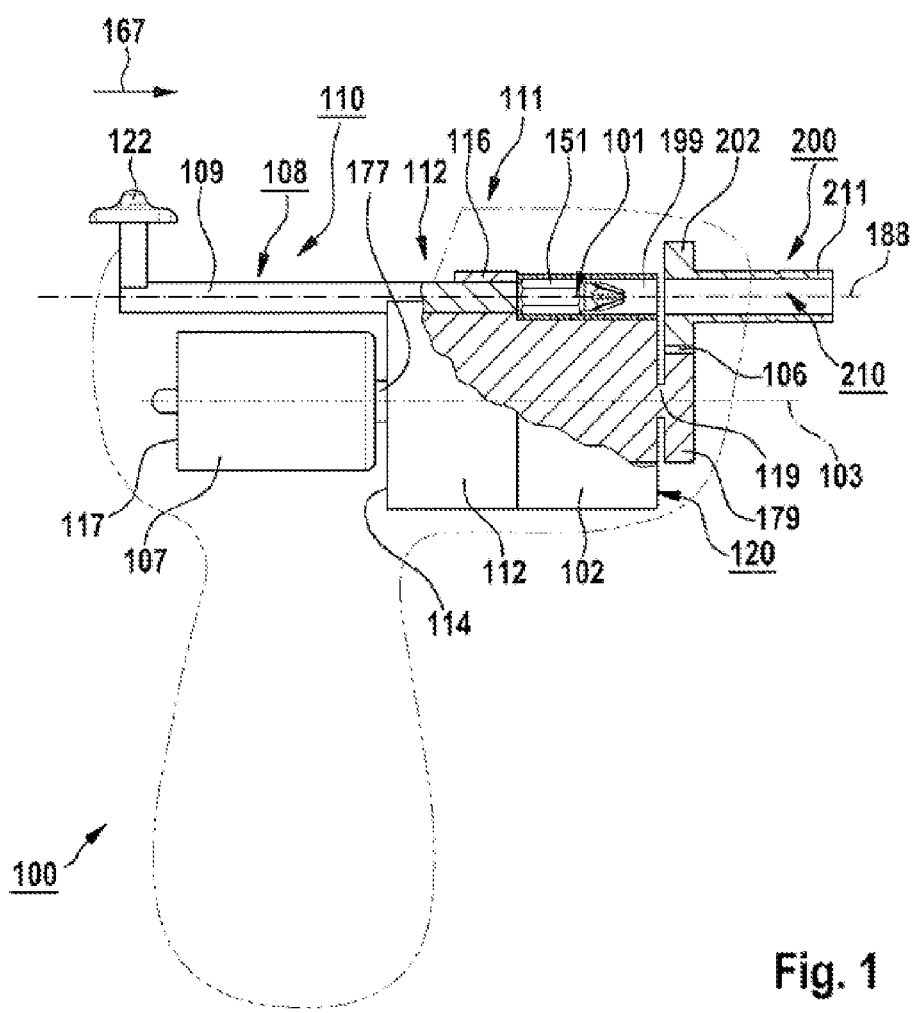
FIG. 1 shows a schematic, partially sectional side view of a hand power tool having a drum-type tool change magazine and a tool receiver according to one embodiment.

FIG. 1 shows, exemplarily, a power tool 100 which can be hand-held and driven by a motor, and which is referred to in the following as a "hand power tool" and which has a tool housing 111, in which a drum-type tool change magazine 120 is disposed so as to be rotatable about a rotation axis 103. The drum-type tool change magazine 120 is realized, exemplarily, in the form of a hollow cylinder, having a ring-type enclosure body 102, in which a multiplicity of tool chambers are provided. Insert tools, for example, can be disposed in the tool chambers, differing insert tools being provided, for example, in all tool chambers. In order to make the drawing clear and easy to understand, in FIG. 1 only a single tool chamber is indicated, and denoted by the reference 199. Disposed exemplarily in this tool chamber 199 there is an insert tool 101, which is also referred to in the following as the "tool" 101.

The hand power tool 100 is realized, by way of illustration, in the manner of a so-called "bit screwdriver" for handling so-called "screwdriver bits". It is pointed out, however, that the present disclosure is not limited to such bit screwdrivers but, rather, can be applied in the case of all power tools in which a drum-type change magazine that can be rotated about a longitudinal axis can be applied, irrespective of whether screwdriver bits or other change objects are stored in the change magazine or whether the power tool is hand-held or not.

According to one embodiment, a tool receiver 200, for receiving the tool 101, is disposed on the tool housing 111, which tool receiver can be rotated about an associated longitudinal or rotation axis 188. By way of illustration, for the purpose of driving the tool 101 the tool receiver 200 is coupled, via a transmission toothed-wheel system 106, to an output shaft 119 of a transmission 112 disposed, exemplarily, in a housing 114. For this purpose, by way of illustration, provided on the output shaft 119 there is a driving toothed wheel 179, which acts in the transmission toothed-wheel system 106 in combination with an output toothed wheel 202 provided on the tool receiver 200. The output shaft 119 is made to rotate by, for example, a motor shaft 177 of a drive motor 107, which is coupled to the transmission 112 and which is disposed, exemplarily, in an associated motor housing 117, the motor housing 117 and the transmission housing 114 being disposed and fastened, exemplarily, in the tool housing 111.

By way of illustration, the tool receiver 200 has a tool receiver portion 211 in the form of a hollow cylinder, in which there is realized, exemplarily, an inner receiver 210 provided with a rotary driver profile (212 in FIG. 2), e.g. an inner polygonal profile, into which the tool 101, e.g. provided with a corresponding outer polygonal coupling 151, can be slid, out of the tool chamber 199, for the purpose of connecting to the tool receiver 200 in a rotationally fixed manner.

A slide-over mechanism 110 is provided for the purpose of sliding the tool 101 over out of the tool chamber 199 into the inner receiver 210 of the tool receiver 200, and out of the inner receiver 210 into the tool chamber 199. This slide-over mechanism comprises, exemplarily, a slide-over element 108, which is realized, exemplarily, in the manner of a slide rod 109, which can be actuated by means of an actuating element 122 and which is guided, for example, in a guide 116 provided on the transmission housing 114, and whose axial end facing toward the tool 101 is realized, for example, so as to be magnetic, for the purpose of magnetic connection to the tool 101. By way of illustration, the actuating element 122 is axially displaceable in an opening 112 provided on the tool housing 111, parallel to the rotation axis 188 of the tool receiver 200.

In the case of an exemplary tool change of the hand power tool 100, the tool change magazine 120 is turned about the rotation axis 103 into a tool change position, in which, for example, the tool chamber 199 with the tool 101 is in flush alignment with the tool receiver 200, or the inner receiver 210 thereof. The actuating element 122 is then displaced in the direction of an arrow 167, in the opening 112, from its—in FIG. 1—rear axial end position as far as a—in FIG. 1—front axial end position, in which the slide rod 109 extends through the tool chamber 199 and blocks the tool 101 in the inner receiver 210 of the tool receiver 200. For the purpose of sliding the tool 101 over out of the tool receiver 200 into the tool chamber 199, the actuating element 122 is then displaced back axially, in a direction opposite to the arrow 167, in the opening 112, into its rear axial end position.

It is pointed out, however, that the principle of functioning and the structure of the hand power tool 100 are already known from DE 10 2006 059 688 A1, which, moreover, describes, for example, adjusting means for rotating the tool change magazine 120 about the rotation axis 103, which adjusting means enable the tool chamber 199 to be aligned so as to be flush with the tool receiver 200. In order to simplify the present description, therefore, the latter explicitly includes the disclosure of DE 10 2006 059 688 A1.

Figure 2:
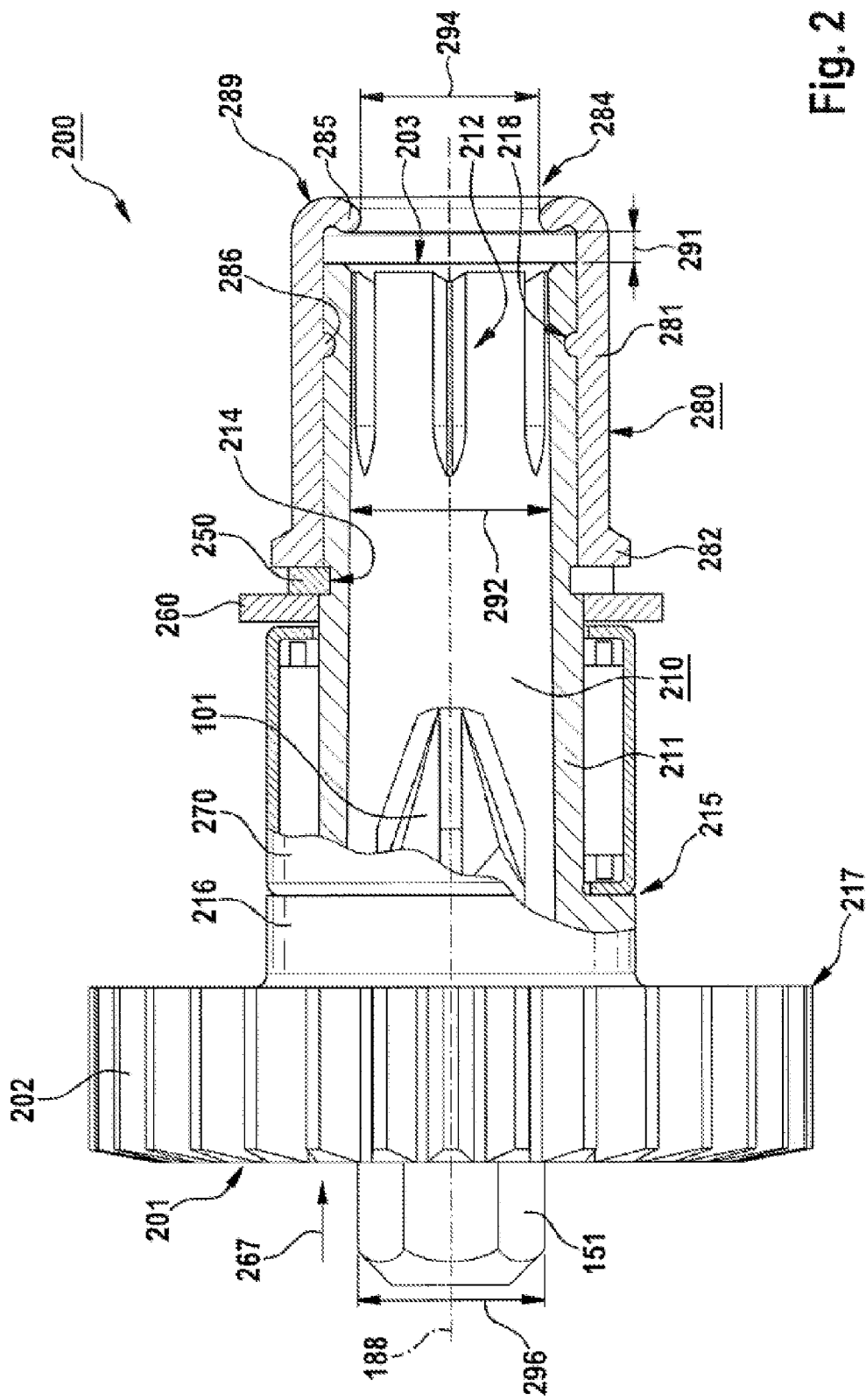
FIG. 2 shows a partially sectional side view of the tool receiver of FIG. 1 with a braking device according to one embodiment.

The tool receiver 200 of FIG. 1, which can be rotated about the rotation axis 188 and which is provided with the tool receiver portion 211 in the form of a hollow cylinder, is shown in FIG. 2 in the case of the tool 101 of FIG. 1 being slid over, exemplarily, from the tool chamber 199 of FIG. 1, in the direction of an arrow 267, into the tool receiver 200. However, it is pointed out that, in order to simplify the drawing, only the tool 101 and the tool receiver 200 are shown. By way of illustration, the latter comprises the output toothed wheel 202 of FIG. 1 in the region of a first axial end 201. A rotary driver profile 212, e.g. an inner polygonal profile, of the inner receiver 210 of FIG. 1 is realized, exemplarily, in the region of an opposite, second axial end 203, for the purpose of receiving the outer polygonal coupling 151 of the tool 101 in a manner secured against rotation.

By way of illustration, in the region of a first shoulder 217 the tool receiver 200 has a transition from the output toothed wheel 202 to a first reduced-diameter region 216 that, at a second shoulder 215, has a transition to the tool receiver portion 211. By way of illustration, a rolling bearing 270, realized in the manner of a needle bearing, is disposed on the tool receiver portion 211 for the purpose of mounting the tool receiver 200 in a rotationally movable manner in the tool housing 111 of FIG. 1. The rolling bearing 270 is fixed, exemplarily, so as to be axially immovable between the first reduced-diameter region 216 and a blocking disk 260. The blocking disk 260, for its part, is blocked in the axial direction of the tool receiver 200 by a retaining ring 250, e.g. a C-ring, which is fastened in an annular groove 214 realized on the tool receiver portion 211.

According to one embodiment, a braking device 280 is provided, exemplarily, in the region between the retaining ring 250 and the second axial end 203 of the tool receiver 200, for the purpose of braking the tool 101 as the tool 101 is slid over from the tool chamber 199 of FIG. 1 into the inner receiver 210. This braking device 280 is preferably realized to prevent the tool 101 from slipping out, or being ejected, from the second axial end 203 as the tool 101 is slid over into the inner receiver 210.

By way of illustration, the braking device 280 comprises a braking member 281, which is elastically deformable, at least regionally, and which is realized in the form of a sleeve, at least portionally, and preferably comprises an elastomer, in particular rubber, at least regionally. According to one embodiment, the braking member 281 is realized as a cap, in the manner of a rubber cap, and is slid onto the tool receiver portion 211, for example in the region of the axial end 203 of the tool receiver 200. The braking member 281 in this case has a collar-type portion 282, which faces toward the retaining ring 260 and which bears, exemplarily, against the retaining ring 260. In order to prevent the braking member 281 from slipping off the tool receiver portion 211, the braking member 281 has, realized on its inner circumference, a ring-type projection 286, for example, which engages in, for example, an annular groove 218 provided on the outer circumference of the tool receiver portion 211.

It is pointed out, however, that the description of the ring-type projection 286 and the annular groove 218 is merely exemplary, and is not to be understood as limiting the disclosure. Rather, the braking member 281 can be fixed in any manner to the outer circumference of the tool receiver portion 211, e.g. by mutually associated latching lugs and recesses, latching lugs engaging in corresponding openings, etc. Moreover, permanent connections such as, for example, bonding or welding may also be used.

According to one embodiment, the braking member 281 has, on its axial end region that faces away from the collar-type portion 282, a through passage opening 284 for the tool 101, through which the tool 101 extends when in an associated tool operating position, after being slid over into the inner receiver 210. In the region of this through passage opening 284, the braking member 281, by way of illustration, has a hook-shaped end region 289 for generating a braking frictional force on the tool 101 as the tool 101 is slid into the through passage opening 284 as a result of the tool 101 being slid over into the inner receiver 210.

The hook-shaped end region 289 is preferably composed of an elastomer, in particular rubber, and serves to generate a spring force that brakes the tool 101 as the result of an elastic deformation as the tool 101 is slid into the through passage opening 284, and thus into the hook-shaped end region 289. For this purpose, the hook-shaped end region 289 has an at least approximately annular friction region 285, having an inner diameter 294 that is both smaller than an outer diameter 296 assigned to the tool 101 and smaller than an inner diameter 292 assigned to the inner receiver 210.

It is pointed out, however, that the annular realization of the friction region 285 is merely exemplary, and not limiting of the disclosure. Rather, differing configurations of the friction region 285 are possible, which friction region can be realized, for example, by a plurality of hook-shaped friction arms provided in the hook-shaped end region 289, etc.

By way of illustration, the hook-shaped end region 289 is bent at an angle in the direction of the tool receiver portion 211. In other words, the hook-shaped end region 289 is realized in such a way that the latter would encompass the axial end 203 of the tool receiver portion 211 when fully slid onto the tool receiver portion 211. According to one embodiment, however, the friction region 285 of the hook-shaped end region 289 is disposed with a predefined spacing 291 in relation to the axial end 203 of the tool receiver 200, such that the hook-shaped end region 289 does not encompass the axial end 203 with an exact fit. This spacing 291 serves to at least reduce an active frictional force that is applied to the tool 101 as the tool 101 is slid over from the tool receiver 200 and back into the tool change magazine 120 of FIG. 1, as compared with a frictional force that is active during sliding over into the tool receiver 200, as described below in the case of FIG. 3.

Figure 3:
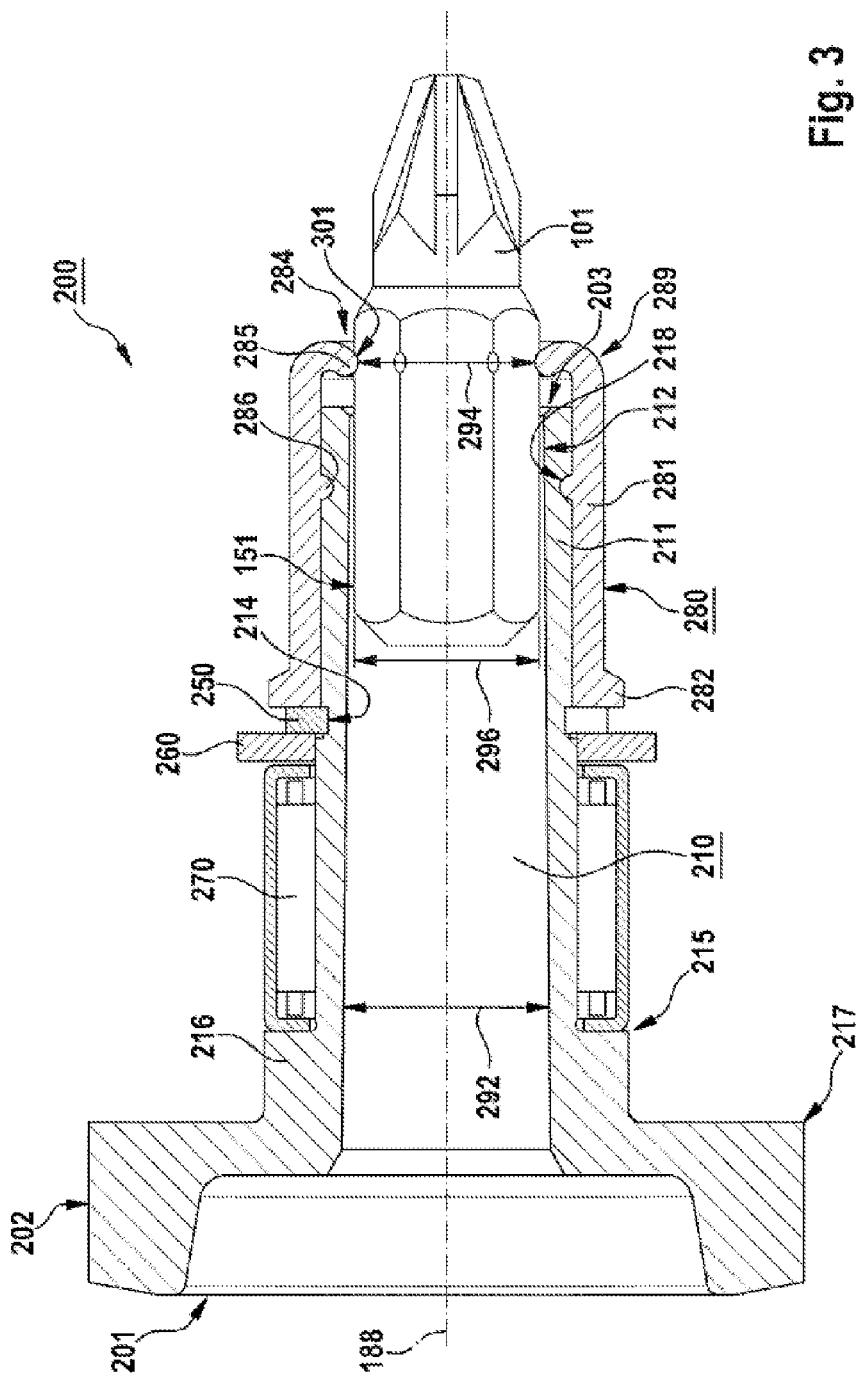
FIG. 3 shows a sectional view of the tool receiver of FIG. 2 with the tool of FIG. 1 disposed therein.

FIG. 3 shows the arrangement of FIG. 2, after the tool 101 has been slid over into the inner receiver 210 of the tool receiver 200, in whose rotary driver profile 212 the outer polygonal coupling 151 is mounted in a manner secured against rotation, when sliding over has been effected, and the tool 101 is thus disposed in the tool operating position, in which the annular friction region 285 of the braking member 281 of FIG. 2 engages, by way of illustration, in a circumferential groove 301 provided on the outer circumference of the outer polygonal coupling 151. The functioning of the braking member 281 as the tool 101 is slid over into this tool operating position is described in the following.

As it is slid into the tool receiver 200 through use of the slide rod 109 of FIG. 1, the tool 101 is slid through the through passage opening 284 of the braking member 281, such that the annular friction region 285 thereof comes into engagement with the tool 101. The friction region 285 can thus exert a predefined braking frictional force upon the tool 101. Moreover, the tool 101 displaces the friction region 285 in an axial direction away from the tool receiver 200 and effects a radially outwardly directed elastic deformation of the hook-shaped end region 289, the friction region 285 being dilated, at least portionally, in a radially outwardly directed direction. Owing to this dilation and the elastic deformation of the hook-shaped end region 289, a braking spring force upon the tool 101 is effected, which reinforces the predefined frictional force. Upon attainment of the tool operating position, then, by way of illustration, the annular friction region 285 engages in the circumferential groove 301 provided on the outer circumference of the outer polygonal coupling 151, such that the tool 101 is also reliably held in the tool receiver 200 when the hand power tool 100 of FIG. 1 is in operation.

When being slid over from the tool operating position into the tool change position shown in FIG. 1, i.e. when the tool 101 is being slid over from the tool receiver 200 into the tool chamber 199 of FIG. 1, the tool 101 is drawn out of the inner receiver 210, in the direction of the output toothed wheel 202, by means of the slide rod 109 of FIG. 1. In this case, owing to the spacing (291 in FIG. 2) in relation to the tool receiver portion 211, the annular friction region 285 can move in the direction of the latter, whereby an approximately radially inwardly directed elastic deformation of the hook-shaped end region 289 is effected, and the frictional and spring force applied to the tool 101 can thus be reduced.

FIG. 4 shows the arrangement of FIG. 3 in order to elucidate the cap-type configuration of the braking member 281. The latter, as described in the case of FIG. 2, is slid, at least portionally, onto the outer circumference of the tool receiver portion 211 of the tool receiver 200.

What is claimed is:

1. A hand power tool comprising:
   a tool bit;
   a tool housing in which a drum-type tool change magazine is disposed, the magazine having at least one tool chamber configured to store the tool bit;
   a tool receiver arranged on the tool housing and configured to receive the tool bit, the tool receiver having an inner receiver, wherein the at least one tool chamber is configured to be aligned so as to be flush with the inner receiver to enable the tool bit to slide from the at least one tool chamber into the inner receiver or from the inner receiver into the at least one tool chamber; and a braking device configured to brake the tool bit as the tool bit slides from the at least one tool chamber into the inner receiver, wherein:

the braking device has a braking member that is sleeved onto the tool receiver and that has a hook-shaped end region, the hook-shaped end region has an at least approximately annular friction region configured to contact the tool bit, the friction region configured to deform to generate a braking frictional force on the tool bit as the tool bit slides into the inner receiver, the inner receiver has a longitudinal axis, a proximal axial end proximal to the at least one tool chamber, and a distal axial end spaced along the longitudinal axis from the proximal axial end and distal from the at least one tool chamber, and the braking member is located at the distal axial end of the inner receiver.

2. The hand power tool according to claim 1, wherein:
the braking device is configured to prevent the tool bit from slipping out from the distal axial end of the inner receiver that is distal from the at least one tool chamber as the tool bit slides from the at least one tool chamber into the inner receiver.

3. The hand power tool according to claim 1, wherein the braking member is at least regionally elastically deformable.

4. The hand power tool according to claim 1, wherein the braking member is configured to engage a groove provided on the tool bit.

5. The hand power tool according to claim 1, wherein the braking member includes a ring-type projection on an inner circumference thereof for engaging an annular groove provided on an outer circumference of the tool receiver.

6. The hand power tool according to claim 1, wherein the hook-shaped end region generates a spring force that brakes the tool bit.

7. The hand power tool according to claim 1, wherein an inner diameter of the friction region is smaller than an inner diameter of the inner receiver.

8. The hand power tool according to claim 1, wherein:
the friction region is disposed with a predefined spacing relative to an axial end of the inner receiver that is distal from the at least one tool chamber.

9. The hand power tool according to claim 1, wherein the braking member comprises rubber.

10. A hand power tool comprising:
a tool bit;
a tool housing including therewithin a drum-type tool change magazine having at least one tool chamber configured to store the tool bit;
a tool receiver arranged on the tool housing and configured to receive the tool bit, the tool receiver having an inner receiver, wherein the at least one tool chamber is configured to be aligned so as to be flush with the inner receiver to enable the tool bit to slide from the at least one tool chamber into the inner receiver or from the inner receiver into the at least one tool chamber; and
a braking device configured to brake the tool bit as the tool bit slides from the at least one tool chamber into the inner receiver, wherein:

the braking device has a braking member that is sleeved onto the tool receiver and that has a hook-shaped end region, the hook-shaped end region having an at least approximately annular friction region for contacting the tool bit, the friction region configured to deform to generate a braking frictional force on the tool bit as the tool bit slides in the inner receiver, the inner receiver has a longitudinal axis, a proximal axial end proximal to the at least one tool chamber, and a distal axial end spaced along the longitudinal axis from the proximal axial end and distal from the at least one tool chamber, the braking member is located at the distal axial end of the inner receiver, and the friction region of the hook-shaped end region is arranged nearest to the longitudinal axis.

11. The hand power tool according to claim 10, wherein:
the braking device is configured to prevent the tool bit from slipping out from the distal axial end of the inner receiver that is distal from the at least one tool chamber as the tool bit slides from the at least one tool chamber into the inner receiver.

12. The hand power tool according to claim 10, wherein the braking member is configured to engage a groove provided on the tool bit.

13. The hand power tool according to claim 10, wherein the braking member includes a ring-type projection on an inner circumference thereof for engaging an annular groove provided on an outer circumference of the tool receiver.

14. The hand power tool according to claim 10, wherein the hook-shaped end region generates a spring force that brakes the tool bit.

15. The hand power tool according to claim 10, wherein the friction region has an inner diameter that is smaller than an outer diameter of the tool bit.

16. The hand power tool according to claim 15, wherein the inner diameter is smaller than an inner diameter of the inner receiver.

* * * * *